(12) United States Patent
Choi et al.

(10) Patent No.: US 10,356,694 B2
(45) Date of Patent: *Jul. 16, 2019

(54) GROUPING OF USER TERMINAL CELL ACCESS INFORMATION IN A SYSTEM INFORMATION BLOCK

(71) Applicant: INTEL DEUTSCHLAND GMBH, Neubiberg (DE)

(72) Inventors: Hyung-Nam Choi, Hamburg (DE); Michael Eckert, Braunschweig (DE); Bernd Kemmer, Eichenau (DE); Wolfgang Math, Munich (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,696

(22) Filed: Apr. 9, 2018

(65) Prior Publication Data

US 2018/0227831 A1    Aug. 9, 2018

Related U.S. Application Data

(63) Continuation of application No. 14/942,751, filed on Nov. 16, 2015, now Pat. No. 9,974,002, which is a
(Continued)

(30) Foreign Application Priority Data

Sep. 21, 2006   (DE) .................. 10 2006 044 529

(51) Int. Cl.
*H04W 48/08*    (2009.01)
*H04W 28/06*    (2009.01)
(Continued)

(52) U.S. Cl.
CPC ........... *H04W 48/08* (2013.01); *H04W 28/06* (2013.01); *H04W 48/12* (2013.01); *H04W 76/27* (2018.02); *H04W 92/12* (2013.01)

(58) Field of Classification Search
CPC ..... H04W 48/08; H04W 48/12; H04W 28/06; H04W 76/046; H04W 92/12
See application file for complete search history.

(56) References Cited

U.S. PATENT DOCUMENTS

| 6,628,946 | B1 | 9/2003 | Wiberg |
| 7,809,373 | B2 | 10/2010 | Park |

(Continued)

FOREIGN PATENT DOCUMENTS

WO    2007072609 A    11/2000

OTHER PUBLICATIONS

European Patent Office; "International Search Report and Written Opinion" for PCT App. No. PCT/DE2007/001590; dated Feb. 27, 2008; 13 pages.
European Patent Office; "International Preliminary Report on Patentability" for PCT App. No. PCT/DE2007/001590; dated Apr. 2, 2009; 9 pages.
European Patent Office; "Examination Report" for European App. No. 07801325.7; dated Jun. 12, 2009; 3 pages.
(Continued)

*Primary Examiner* — Charles C Jiang
*Assistant Examiner* — Ryan C Kavleski
(74) *Attorney, Agent, or Firm* — Schwabe, Williamson & Wyatt, P.C.

(57) ABSTRACT

Disclosed is a method for generating and transmitting system information in a mobile radio cell. In said method, system information is grouped into several information frames, information required for a mobile user device in order to verify if said mobile user device has access to the mobile radio cell being grouped into a single information frame, and the information frames are fed to the data securing layer by the network layer and are transmitted by means of the physical layer.

18 Claims, 4 Drawing Sheets

Related U.S. Application Data continuation of application No. 12/441,920, filed as application No. PCT/DE2007/001590 on Sep. 6, 2007, now Pat. No. 9,226,194.

(60) Provisional application No. 60/826,474, filed on Sep. 21, 2006.

(51) Int. Cl.
    *H04W 48/12*     (2009.01)
    *H04W 76/27*     (2018.01)
    *H04W 92/12*     (2009.01)

(56) References Cited

U.S. PATENT DOCUMENTS

| | | | |
|---|---|---|---|
| 8,380,204 | B2 | 2/2013 | Choi et al. |
| 2003/0218995 | A1* | 11/2003 | Kim .................. H04W 36/0066 370/318 |
| 2005/0025181 | A1 | 2/2005 | Nazari |
| 2005/0265303 | A1 | 12/2005 | Edwards et al. |
| 2006/0035662 | A1 | 2/2006 | Jeong et al. |
| 2006/0258386 | A1 | 11/2006 | Jeong et al. |
| 2007/0053383 | A1 | 3/2007 | Choi et al. |
| 2007/0099615 | A1 | 5/2007 | Farnsworth et al. |
| 2007/0111741 | A1 | 5/2007 | Roberts |
| 2009/0011769 | A1 | 1/2009 | Park et al. |
| 2009/0098892 | A1 | 4/2009 | Trogolo et al. |
| 2010/0167746 | A1 | 7/2010 | Lee et al. |
| 2010/0167750 | A1 | 7/2010 | Lee et al. |
| 2010/0195579 | A1 | 8/2010 | Park et al. |
| 2011/0093754 | A1 | 4/2011 | Chun et al. |

OTHER PUBLICATIONS

Korean Patent Office; "Office Action" for Korean App. No. 2009-7008129; dated Feb. 28, 2011; 5 pages, inclusive of English translation.

"Universal Mobile Telecommunications System (UMTS); Radio Resource Control (RRC); Protocol Specification (3GPP TS 25331 version 7.1.0 Release 7); ETSI TS 125 331" ETSI Standards, European Telecommunications Standards Institute, Sophia-Antipo, France, Bd. 3-R2, Nr. V710, Jun. 2006.

3GPP TR 25.813 V0.8.3 3rd Generation Partnership Project; Technical Specification Group Radio Access network; Evolved Universal Terrestrial Radio Access (E-UTRA) and Evolved Universal Terrestrial Radio Access Network (E-UTRAN); Radio Interface Protocol Aspects (Release 7); Apr. 2006; http://www.3gpp.org/ftp/Specs/html-info/25813.htm.

German Patent Office; "Examination Report" for German App. No. 102006044529.5; dated Jun. 6, 2007; 4 pages.

Chinese Patent Office; "First Office Action" for Chinese App. No. 2007800346493; dated Jun. 11, 2010; 4 pp., inclusive of English translation.

Indian Patent Office; "First Examination Report" for Indian App. No. 986/KOLNP/2009; dated Mar. 13, 2014; 2 pages.

Dan Geun Sung, "Telecommunications Networks"; EE520; KAIST; 2000.

Samuel C. Yang; "CDMA RF System Engineering"; Chapter 5; Artech house; 1998; pp. 105-109.

Office Action dated Jun. 6, 2017 from U.S. Appl. No. 14/942,751, 13 pages.

* cited by examiner

FIG 1

GROUPING OF USER TERMINAL CELL ACCESS INFORMATION IN A SYSTEM INFORMATION BLOCK

RELATED APPLICATIONS

This application is a continuation of U.S. patent application Ser. No. 14/942,751 filed on Nov. 16, 2015, which is a continuation of U.S. patent application Ser. No. 12/441,920 filed on Mar. 19, 2009, now issued as U.S. Pat. No. 9,226,194 on Dec. 29, 2015, which is a national stage entry according to 35 U.S.C. § 371 of PCT App. No. PCT/DE2007/001590 filed on Sep. 6, 2007, which claims priority from German App. No. 10 2006 044 529.5 filed on Sep. 21, 2006 and from U.S. Provisional App. No. 60/826,474 filed on Sep. 21, 2006, all of which are hereby incorporated by reference in their entireties.

TECHNICAL FIELD

Various embodiments relate to a method for generating and transmitting system information, a network device, a method for verifying if a mobile radio user device is provided with access to a mobile radio cell, a mobile radio user device and a method for determining valid system information.

BACKGROUND

A base station of a cellular mobile radio communication network transmits, in a mobile radio cell, system information which enables the mobile radio user devices located in the mobile radio cell to use the mobile radio communication network. Efficient methods for transmitting this system information are desirable.

SUMMARY

A method for generating and transmitting system information in a mobile radio cell is provided, in which method system information is grouped to form several information blocks, the information required for a mobile radio user device in order to verify if said user device is provided with access to the mobile radio cell being grouped into a single one of the information blocks, at least one information message is formed from the information blocks, the information message is supplied to a unit of the data link layer by a unit of the network layer and the unit of the data link layer transmits the information message by means of at least one unit of the physical layer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

In cellular mobile radio communication systems such as, for example, mobile radio communication systems according to the GSM (Global System for Mobile Communications) standard or the UMTS (Universal Mobile Telecommunications System) standard, important system information of a mobile radio cell, that is to say system information which is required for operating a mobile radio user device in the mobile radio cell, is conveyed by broadcasting from a base station which operates the mobile radio cell to all mobile radio user devices which are located in the mobile radio cell. This system information is, for example, network operator-specific information such as the identity of the mobile radio network to which the mobile radio cell belongs, for example a PLMN (Public Land Mobile Network) identity, and the identity of the mobile radio cell (cell identity) or other information which is suitable for an unambiguous identification of mobile radio network and/or mobile radio cells.

According to an exemplary embodiment of the invention, a method for generating and transmitting system information in a mobile radio cell is provided, in which method system information is grouped to form several information blocks, the information required for a mobile radio user device in order to verify if said user device is provided with access to the mobile radio cell being grouped into a single one of the information blocks, at least one information message is formed from the information blocks, the information message is supplied to a unit of the data link layer by a unit of the network layer and the unit of the data link layer transmits the information message by means of at least one unit of the physical layer.

According to a further exemplary embodiment of the invention, a method for verifying if a mobile radio user device is provided with access to a mobile radio cell is provided in which method it is determined in which information block of a multiplicity of information blocks transmitted in the mobile radio cell the information required for the mobile radio user device in order to verify if said user device is provided with access to the mobile radio cell is transmitted, the information block is received before other information blocks of the multiplicity of information blocks are received, and it is verified if access to the mobile radio cell is provided for the mobile radio user device before other information blocks of the multiplicity of information blocks are received.

According to other exemplary embodiments of the invention, a network device and a mobile radio user device according to the method, described above, for generating and transmitting system information in a mobile radio cell and respectively the method, described above, for verifying if a mobile radio user device is provided with access to a mobile radio cell are provided.

To illustrate, all of the system information needed by a mobile radio user device for being able to decide whether it can successfully register in a mobile radio cell, that is to say all suitability information of the system information, is grouped to form one information block. In this manner, it is only necessary that the mobile radio user device reads in this information block in order to be able to decide whether it should attempt to register in the mobile radio cell.

Compared with the procedure of conveying the suitability information in different information blocks, the reception of the suitability information and thus the deciding whether a mobile radio cell is suitable for a registration can be accelerated. This makes it possible to reduce the time needed by a mobile radio user device for finding a mobile radio cell in which it can register. Finally, the mobile radio user device can successfully register in a mobile radio cell after a shorter time and set up a communication link to a base station.

According to another exemplary embodiment of the invention, a method for determining valid system information by a mobile radio user device is provided, in which method an identification transmitted in a mobile radio cell is received which identifies a set of information required for the mobile radio user device in order to verify if said user device is provided with access to the mobile radio cell, which set of information is currently valid in the mobile radio cell, and in the case where the set of information is stored, it is verified by means of the stored set of information if the mobile radio user device is provided with access to the mobile radio cell.

In this manner, it is not necessary that the mobile radio user device receives information but can use the stored information which leads to a further gain in time. A stored set of information can also be marked with a validity period which specifies until when it is valid for the identification, in other words is identified by this identification. In this case, the stored set of information is used for verifying if the mobile radio user device is provided with access to the mobile radio cell only when the set of information is still valid for the identification. The identification can be transmitted, for example, in a master information block (MIB). To illustrate, it can be signaled in a master information block which (possibly) stored set of information is currently valid in the mobile radio cell.

The mobile radio cell is a mobile radio cell of a mobile radio network which is configured, for example, in accordance with the UMTS standard, the GSM standard, the CDMA2000 (Code Division Multiple Access) standard or the FOMA (Freedom of Mobile Access) standard.

The information message is, for example, a PDU (Packet Data Unit) which is supplied to the RLC layer from the RRC layer. The information message is a system information message in one embodiment.

Exemplary embodiments of the invention can be implemented both in software, hardware and mixed form (that is to say partially software, partially hardware).

The further embodiments of the invention which are described in conjunction with the method for generating and transmitting system information in a mobile radio cell correspondingly also apply to the method for verifying if a mobile radio user device is provided with access to a mobile radio cell, to the mobile radio user device and to the method for determining valid system information.

The information blocks are, for example, a master information block (or several master information blocks) or system information blocks.

The information block, into which the information required for the mobile radio user device in order to verify if said user device is provided with access to the mobile radio cell is grouped, is, for example, a master information block. The information block, into which the information required for the mobile radio user device in order to verify if said user device is provided with access to the mobile radio cell is grouped, can also be a system information block.

The unit of the data link layer is, for example, a unit of the RLC (Resource Link Control) layer and the unit of the network layer is, for example, a unit of the RRC (Radio Resource Control) layer.

In one embodiment, the information block, into which the information required for the mobile radio user device in order to verify if said user device is provided with access to the mobile radio cell is grouped, does not contain any other information. Since the information block is thus reduced to its minimum size, it can be read in very rapidly as part of a verification if the mobile radio cell is suitable for a registration.

The system information is transmitted, for example, by a base station which operates the mobile radio cell. The unit of the data link layer is arranged, for example, in the base station. The unit of the network layer can also be arranged in the base station.

In one embodiment, the information required for the mobile radio user device in order to verify if said user device is provided with access to the mobile radio cell is associated with an identification, which enables the mobile radio user device to verify if it has already stored the information and which signals that the information identified by the identification is currently valid in the mobile radio cell.

For example, the identification is inserted into the information block into which the information required for the mobile radio device in order to verify if said user device is provided with access to the mobile radio cell is grouped.

The information can also be provided with validity period information which specifies how long the identification for the information is valid. This prevents the possible identifications available (for example from 0 to 63, that is to say 6 bits) from being issued completely to sets of information and new sets of information can no longer be provided with an identification.

Figure 1:
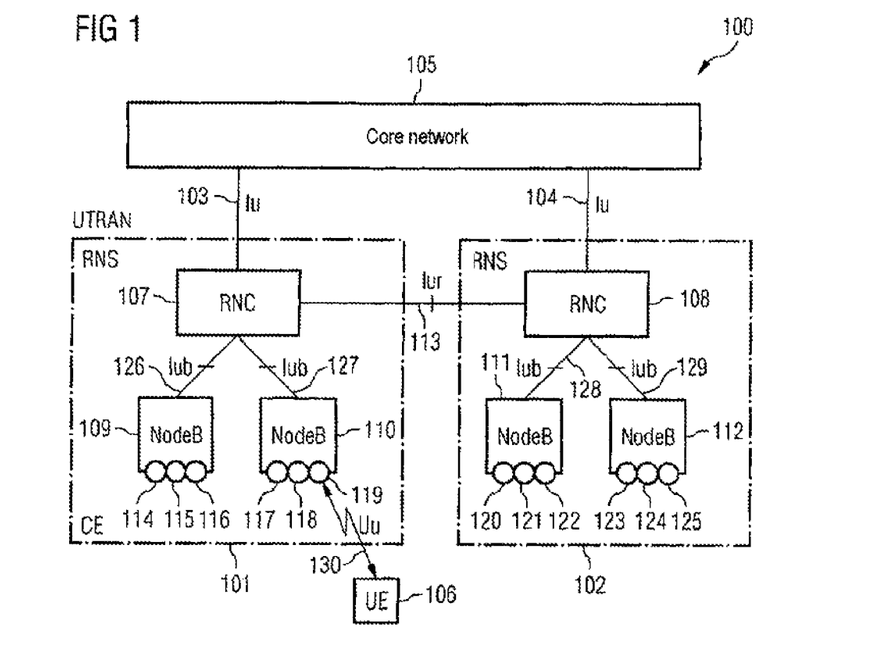
FIG. 1 shows a communication system according to an exemplary embodiment of the invention.

FIG. 1 shows a communication system 100 according to an exemplary embodiment of the invention.

The communication system 100 has the architecture of a UMTS radio network, which is also called UMTS Terrestrial Radio Access Network (UTRAN).

The communication system 100 has a multiplicity of radio network subsystems (RNS) 101, 102 which are in each case coupled to the UMTS core network 105 by means of an Iu interface 103, 104.

The RNS 101, 102 in each case has a radio network controller (RNC) 107, 108 and one or more base stations 109, 110, 111, 112. A UMTS base station is also called node B.

The RNCs 107, 108 of different RNS 101, 102 are coupled to one another by means of an Iur interface 113.

Each base station 109, 110, 111, 112 of an RNS 101, 102 is coupled to the RNC 107, 108 of the RNS 101, 102 by means of an Iub interface 126, 127, 128, 129. Each base station 109, 110, 111, 112 of an RNS 101, 102 operates one or more mobile radio cells (CE) 114 to 125 within the RNS 101, 102 by radio engineering means. The RNC 107, 108 of an RNS 101, 102 monitors the allocation of radio resources of the mobile radio cells 114 to 125 in the RNS 101, 102.

Between a base station 109, 110, 111, 112 and a mobile radio user device (user equipment, UE) 106 in a mobile radio cell 114 to 125, information signals and data signals are transmitted by means of radio transmission technology by means of an air interface (Uu) 130. For example, a separate signal transmission in the uplink direction and downlink direction is achieved by a corresponding separate assignment of frequencies or frequency ranges in the FDD (Frequency Division Duplex) mode. Uplink is understood to be the signal transmission from the mobile radio user device 106 to a base station 109, 110, 111, 112 and downlink is understood to be the signal transmission from a base station 109, 110, 111, 112 to the mobile radio user device 106. The signals to different mobile radio user devices and from different mobile radio user devices in the same mobile radio cell are separated, for example, by means of orthogonal codes, for example by means of the so-called CDMA (Code Division Multiple Access) method.

In the mobile radio cells 114 to 125, system information relating to the operation of mobile radio user devices in the respective mobile radio cell are transmitted by means of the logical broadcast control channel (BCCH). The logical BCCH channel is mapped onto the transport channel BCH (Broadcast Channel) and physically transmitted by means of the physical channel P-CCPCH (Primary Common Control Physical Channel) by means of the air interface. This is illustrated in FIG. 2.

Figure 2:
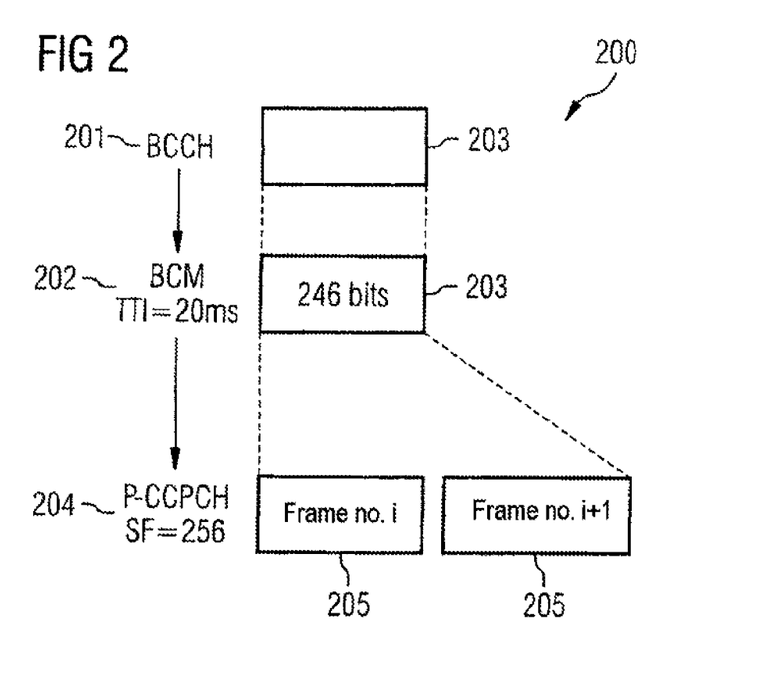
FIG. 2 shows a data flowchart.

FIG. 2 shows a data flowchart 200.

System information bits are transmitted to system information blocks 203 of in each case 246 bits by means of the BCCH 201 and the BCH 202. The system information blocks 203 are transmitted to the physical layer for sending out by means of the physical channel P-CCPCH 204 and are supplemented with a word, for example of 26 bits length, for error recognition according to the CRC (Cyclic Redundancy Check). The information bits and the bits appended for error recognition are jointly channel-coded in the physical layer, modulated and spread with a CDMA code, known throughout the system, with the spreading factor SF=256. Since a fixed transmission time interval (TTI) of 20 ms is defined (TTI=20 ms) for the BCH, the channel-coded bits are broadcast by means of two P-CCPCH transmit frames 205 in two blocks with in each case a length of 20 ms by means of the air interface in the respective mobile radio cell.

The format of the system information blocks 203 will be explained with reference to FIG. 3 in the text which follows.

Figure 3:
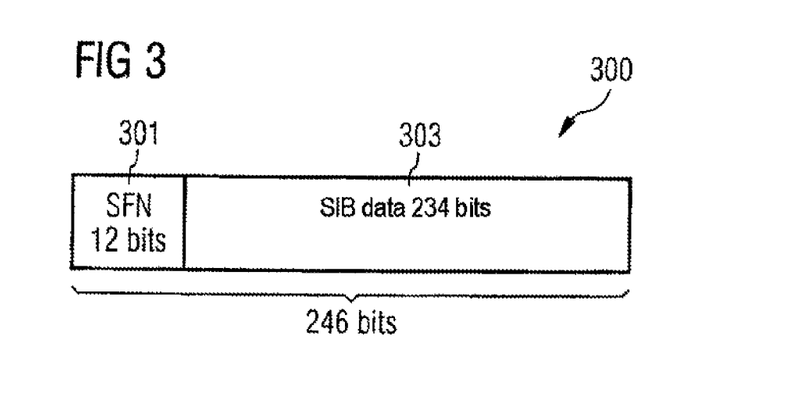
FIG. 3 shows a system information block according to an exemplary embodiment of the invention.

FIG. 3 shows a system information block (SIB) 300 according to an exemplary embodiment of the invention.

The system information block 300 has a system frame number (SFN) 301 which consists of 12 bits. The system frame number is followed by SIB data 302 which contains system information and consists of 234 bits. The system frame number 301 specifies the timing used in the respective mobile radio cell and is used for synchronization between base station and mobile radio user device.

The system information block in which certain system information is transmitted is decided on the basis of the type of system information. Apart from the system information blocks, master information blocks (MIB) and scheduling blocks (SB) are also transmitted, in the present exemplary embodiment in the same way as has been explained with reference to FIG. 2 for the system information blocks. In a master information block, for example, the PLMN identify of the mobile radio network is transmitted, and scheduling information with respect to the transmission of the system information blocks. In the scheduling blocks, scheduling information with respect to the system information blocks is also signaled.

In a UMTS mobile radio network, 18 types of system information blocks are defined. The allocation of certain system information to system information blocks, that is to say the allocation of which system information block contains which system information, is as follows, for example:

SIB 1 contains information about the UMTS core network and information on configuration of system-related timers and constants.

SIB 3 contains parameter values which are required for selecting mobile radio cells and for the change of mobile radio cell by a mobile radio user device.

SIB 5 contains information about the configuration of the common physical radio resources for mobile radio user devices which are in rest mode (ideal mode).

SIB 6 contains information on the configuration of the common physical radio resources for mobile radio user devices which are in connected mode.

SIB 11 contains information for carrying out measurements.

In the system information block with the number 16, parameters of the so-called "predefined configurations" are transmitted which have radio bearer parameters, transport channel parameters and physical channel parameters. When a signaling connection is set up, a mobile radio user device signals to the UMTS radio access network (UTRAN) an item of information called "predefined configuration value tag". This signals to the mobile radio network that the mobile radio user device has stored the "predefined configurations" contained in the system information block having the number 16. In the RRC connection setup message, the UMTS radio access network signals to the mobile radio user device which predefined configuration is to be used, in the form of the so-called "predefined configuration identity". From UMTS in Version Release 5 onward, an analogous procedure is also possible for the "radio bearer reconfiguration" procedure.

Furthermore, default configurations can be provided for RAB (Radio Access Bearer) and signaling connections. These default configurations are permanently stored in mobile radio user devices. Instead of a complete list of parameters for setting up an RAB or a signaling connection, the UMTS radio access network can transmit to a mobile radio user device a so-called "default configuration identity" which specifies a default configuration (this is possible from UMTS in Version Release 6 onward). Default configurations are used for the "Handover to UTRAN" procedure in UMTS in Version R99 (Release 1999) and for the "RRC Connection Setup" and "Radio Bearer Reconfiguration" procedures in UMTS in Version Release 5.

So that a mobile radio user device can correctly use a mobile radio network, it ensures that it has received the current system information in the mobile radio cell in which it is located. If the amount of system information which must be read in is very large, however, the reception and the reading in of the system information is correspondingly time-intensive for the mobile radio user devices. This is of disadvantage particularly in the case of the system information which specifies whether a mobile radio cell is suitable for a mobile radio user device, which will be called suitability information in the text which follows. Reading in the suitability information is necessary for a mobile radio user device whenever it would like to change to another mobile radio cell (cell reselection) and when the mobile radio user device is switched on.

According to one exemplary embodiment of the invention, all suitability information is transmitted in the master information block so that the reading in of the suitability information can be carried out efficiently and rapidly. In one embodiment, apart from the suitability information, no other information is transmitted in the master information block. All scheduling information is transmitted in the scheduling blocks. The size of the master information block can be reduced in this manner and the time required for reading in the master information block can be correspondingly reduced.

The suitability information is, for example:

the PLMN identity, that is to say an identification of the mobile radio network to which the mobile radio cell belongs the LAC (Local Area Code), that is to say a code of the mobile radio network Qqualmin, an item of information on the minimum quality level required in the mobile radio cell in decibels Qrxlevmin, an item of information of the minimum receiver level in the mobile radio cell in dBm an item of information on the maximum permissible transmitting power on the uplink cell barred information, for example a cell bar bit, which indicates if the mobile radio cell is barred for mobile radio user devices (for example mobile radio user devices without particular privileges), an intrafrequency cell reselection indicator which specifies if the mobile radio user device can dial into the mobile radio cell by using the same frequency as in the mobile radio cell previously used by the mobile radio user device the value of the Tbarred parameter, which specifies how long a mobile radio user device should remove the mobile radio cell from its list of adjacent mobile radio cells when the mobile radio cell is identified as barred the information regarding if the mobile radio cell is reserved for use by the operator of the mobile radio network (cell reserved for operator use)

an item of information regarding if the mobile radio cell is reserved for a future extension of the mobile radio network (cell reservation extension).

As mentioned, the suitability information is transmitted, for example, in the master information block. The master information block is correspondingly arranged, for example in accordance with Table 1. Other information which is transmitted in the master information block in conventional mobile radio communication networks is transmitted by means of the scheduling blocks or by means of system information blocks in one exemplary embodiment. For example, all scheduling information which relates to system information blocks and which have been transmitted in the master block in conventional mobile radio networks are transmitted by means of the scheduling blocks in one exemplary embodiment.

TABLE 1

| Name of the information element/the group | Requirement | Multi | Type | Description of the semantics |
|---|---|---|---|---|
| PLMN identity | MP | | PLMN identity | |
| LAC | MP | | Bit string (16) | The first/left-most bit is the most significant bit |
| Qqualmin | MP | | Integer (−24 . . . 0) | Ec/N0, [dB] |
| Qrxlevmin | MP | | Integer (−115 . . . −25 in steps of two) | RSCP, [dBm] |
| Maximum permissible Uplink transmitting power | MP | | Maximum Permissible UL TX power | [dBm] UE_TXPWR_MAX_RACH |
| Cell barred | MP | | Information from the list (barred/not barred) | |
| Intra-frequency cell reselection indicator | CV barred | | Information from list (permissible/not permissible) | |
| $T_{barred}$ | CV barred | | Integer (10, 20, 40, 80, 160, 320, 640, 1280) | [s] |
| Cell reserved for use by the operator | MP | | Information from list (reserved/not reserved) | |
| Reserved for extension | MP | | Information from list (reserved/not reserved) | |

According to a further exemplary embodiment of the invention, the entire suitability information is transmitted within a system information block which is sent, for example, in fixed time association with the master information block. This means that it is specified after how much time after transmission of the master information block the system information block is sent out by the base station.

For example, the system information block is always sent out by means of a time frame of 10 ms in length which follows a time frame in which the master information block has been sent out.

In another exemplary embodiment of the invention, default values are used for the system information. This means that a mobile radio user device stores default configurations (stored configurations), that is to say possible values for the system information, for example possible arrangements of system information blocks, the possible system information being provided with an identification, for example with a stored configuration ID, for example a number between 1 and N.

According to one exemplary embodiment of the invention, this is applied for the suitability information and will be explained in greater detail with reference to FIG. 4 in the text which follows.

Figure 4:
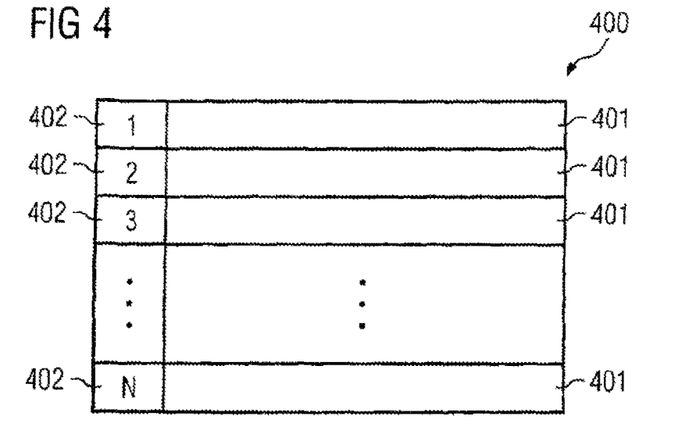
FIG. 4 shows a data structure according to an exemplary embodiment of the invention.

FIG. 4 shows a data structure 400 according to an exemplary embodiment of the invention.

The data structure 400 is stored in a mobile radio user device and is used for storing standard configurations for the suitability information. That is to say, possible valid values for the suitability information are stored in the form of the data structure 400 in the mobile radio user device.

The data structure 400 has several sets of suitability information 401. Each set of suitability information 401 contains values for the parameters corresponding to the suitability information, that is to say, for example, for the abovementioned parameters of the values of which the suitability information consists. The sets of suitability information specify suitability information which may be valid in a mobile radio cell. Each set of suitability information 401 is provided with a suitability information identification 402 so that reference can be made to each set of suitability information 401.

Instead of transmitting the complete suitability information to the mobile radio user device, a base station, if the suitability information, which is valid in the mobile radio cell operated by the base station corresponds to one of the sets of suitability information 401, can transmit only the suitability information identification to the mobile radio user device in order to signal to the mobile radio user device which suitability information is valid in the mobile radio cell.

For example, the date structure 400 has maximally N sets of suitability information 401. Correspondingly, the suitability information identification has, for example, values from 1 to N. Storing default values for the suitability information, for example in the form of the data structure 400, is efficient and not very complex compared with information which, for example, characterizes the structure of a radio bearer for a radio bearer setup.

While when storing the configuration of a radio bearer (RAB configuration) with a suitable indexing, so that during the setting up of a radio bearer the configuration of a radio bearer can be rapidly accessed by using an index and thus the setting up of a radio bearer can be accelerated, a considerable complexity arises due to the high volume of data of the parameters required for describing a radio bearer, this is not the case when storing default configurations for suitability information and default values for suitability information can be administered efficiently and with little complexity.

Apart from the lesser volume of data of the suitability information compared with parameters which are required for describing a radio bearer, the reason for this is that the suitability information changes less frequently compared with RAB configurations.

For example, the data structure 400 is built up by the suitability information sent out by the base stations being sent out together with a suitability information identification 402, and the mobile radio user device stores the suitability information sent out in the form of a set of suitability information 401 together with the suitability information identification 402 in the data structure 400. In this context, the suitability information can be sent out in such a manner that the suitability information is transmitted all together in a master information block, the suitability information is transmitted all together in a system information block or the suitability information can also be transmitted distributed over several system information blocks. If a base station sends out suitability information together with a suitability information identification, the mobile radio user device can check the data structure 400 and determine by means of the suitability information identifications 402 whether the suitability information sent out matches a set of suitability information 401. If this is the case, the mobile radio user device does not need to read in the suitability information but can use the stored set of suitability information. Otherwise, the mobile radio user device reads in the suitability information sent out and stores it in the data structure together with the suitability information identification sent out.

In an exemplary embodiment of the invention, default values are stored for each system information block. That is to say that, analogously to FIG. 4, an analogous data structure 400, in which sets of system information which are sent out in this system information block are stored, is provided in the mobile radio user device for each system information block.

For example, a base station sends out in the master information block, for each system information block, the system information identification (analogously to the suitability information identification 402) which specifies which set of system information is valid for this system information block, in other words which version of the system information block is currently valid. Such a master identification block is shown in Table 2.

TABLE 2

| Name of the information element/the group | Requirement | Multi | Type | Description of the semantics |
|---|---|---|---|---|
| List of stored configurations | | 1 to N | | |
| >SIB number | MP | | Integer (0 . . . 18) | |
| >Stored configuration ID | MP | | Integer (0 . . . 64) | |
| PLMN identity | MP | | PLMN identity | |
| LAC | MP | | Bit string (16) | The first/left-most bit is the most significant bit |
| Qqualmin | MP | | Integer (−24 . . . 0) | Ec/N0, [dB] |
| Qrxlevmin | MP | | Integer (−115 . . . −25 in steps of two) | RSCP, [dBm] |

TABLE 2-continued

| Name of the information element/the group | Requirement | Multi | Type | Description of the semantics |
|---|---|---|---|---|
| Maximum permissible uplink transmitting power | MP | | Maximum permissible UL TX power | [dBm] UE_TXPWR_MAX_RACH |
| Cell barred | MP | | Information from the list (barred/not barred) | |
| Intra-frequency cell reselection indicator | CV barred | | Information from list (permissible/not permissible) | |
| $T_{barred}$ | CV barred | | Integer (10, 20, 40, 80, 160, 320, 640, 1280) | [s] |
| Cell reserved for use by the operator | MP | | Information from list (reserved/not reserved) | |
| Reserved for extension | MP | | Information from list (reserved/not reserved) | |

In this example, the master identification block, similar to the master identification block which is arranged according to Table 1, contains the suitability information in accordance with lines 5 to 14 in Table 2. Corresponding to lines 2 to 4, the master identification block contains for each system information block the system information block identification which specifies which set of system information is currently valid for this system information block. In this example, the system information block identifications have the values 0 to 64 (compare line 4, column 4 of Table 2) and the system information blocks are numbered through from 0 to 18 (compare line 3, column 4 of Table 2). The ">" symbols indicate that the information, according to line 3 and line 4 of Table 4, that is to say the information of a system information block (SIB number) is stored together with the system block identification for each system block in the form of the list of stored information (compare line 2 of Table 2).

It can be provided that for each set of system information (for example set of suitability information 401), a validity period is defined which specifies a time interval after which the set of system information from the mobile radio user device on which it is stored is considered as no longer valid. This makes it possible to avoid that, after a certain operating time of the mobile radio network, all system information identifications are issued and no more new system information sets can be stored in the mobile radio user devices or can no longer be addressed by means of a system information identification.

If, for example, the range of values of the system information identification is 0 to 64 as in the above example, no new system information sets could be addressed unambiguously by a base station by means of a system information identification as soon as 65 system information sets have been stored and addressed by means of the system information identification, that is to say a set of system information which corresponds to none of the sets of system information previously addressed by means of the system information identification could no longer be identified or addressed.

By using a validity period after which the sets of system information are no longer valid, system information identifications are demonstratively released and are available for addressing new sets of system information and can be reoccupied correspondingly.

The ISO (International Organization for Standardization) has defined a reference model consisting of seven layers for describing manufacturer-independent communication systems which is called ISO/OSI model. The ISO/OSI model is used for describing a communication between various network devices of different manufacturers. OSI stands for Open System Interconnection. Most of the freely usable network protocols are based on this reference model, for example TCP/IP (Transport Control Protocol/Internet Protocol). The seven levels of the ISO/OSI model are defined in such a way that they build upon one another and that units of one level can be used independently of the units of other levels. The units of levels 1 to 4 form the transport system, that is to say in levels 1 to 4 the communication channels are defined physically and logically, and the units of levels 5 to 7 form the application system and are predominantly used for representing information. The seven levels of the ISO/OSI model are designated in their order from 1 to 7 as physical layer, data link layer, network layer, transport layer, session layer, presentation layer and application layer.

In Table 3, the designation and examples of protocols which are used as part of the respective layer are specified for each layer.

TABLE 3

| ISO/OSI layer model | | |
|---|---|---|
| No. | Designation | Examples |
| 7 | Application layer | Web browser, mail program |
| 6 | Presentation layer | HTML, XML, MIME |
| 5 | Session layer | http, FTP, POP3, SMTP |
| 4 | Transport layer | TCP |
| 3 | Network layer | IP, RRC |
| 2 | Data link layer | PPP, RLC, MAC |
| 1 | Physical layer | IEEE 802, PHY |

The units of the application layer provide the interface between the respective user and application programs, for example for users of email programs or data transmission services.

The units of the presentation layer prepare data for use by the units of the application layer. In this context, data are decoded, for example, converted between different formats, encrypted or checked.

The units of the session layer provide services which are used for organizing the data transmission. For example, it is guaranteed that communication connections can be resumed again in spite of temporary interruptions. For this purpose, tokens in data packets are used, for example.

The units of the transport layer provide the possibility of setting up and clearing down communication connections in a proper manner, synchronizing communication connections and distributing to the communication connections data packets for transmission by means of several communication connections (multiplexing). The transport layer forms the interface between the transport system and the application system according to the ISO/OSI model. In addition, data packets are segmented by units of the transport layer and the congestion of data packets can be prevented.

The units of the network layer handle the switching and delivery of data packets. For example, they carry out the assembly of routing tables and the routing. If data packets are only to be forwarded, they are provided with a new intermediate destination address by units of the network layer and are not forwarded to units of higher layers. The coupling of different network topologies is also carried out in the network layer.

The units of the data link layer organize and monitor the access to the data transmission medium. Bit streams to be transmitted are segmented in the data link layer and combined to form packets. Furthermore, data can be subjected to an error check, for example a checksum can be appended to a data packet. A compression of data can also be carried out. Further tasks of the units of the data link layer are the sequence monitoring, the time monitoring and the flow control.

The data link layer can be subdivided into two sublayers. The upper sublayer, that is to say the sublayer in the direction of the network layer, is called the logical link control (LLC) layer and the lower sublayer, that is to say the sublayer in the direction of the physical layer, is called the medium access control (MAC) layer. The functionality of the units of the MAC layer can be developed differently depending on the transmission medium used (that is to say depending on the arrangement of the physical layer). The main tasks of the MAC layer usually include:

- Detecting where frames in the bit stream received by the units of the physical layer start and stop (when receiving data).
- Dividing the data stream into frames and possibly inserting additional bits into the frame structure so that the start and the end of a frame can be detected at a receiver (when transmitting data).
- Finding transmission errors, for example by inserting a checksum during transmission or by corresponding control calculations during reception, respectively.
- Inserting and evaluating MAC addresses during transmission and during reception, respectively.
- Access control, that is to say when several units wish to access the physical transmission medium, deciding which of the units is granted the right of access.

The physical layer relates to characteristics of the transmission medium. For example, wavelengths and signal levels to be used are defined. The units of the physical layer convert the bit sequences to be transmitted into transmittable formats.

Figure 5:
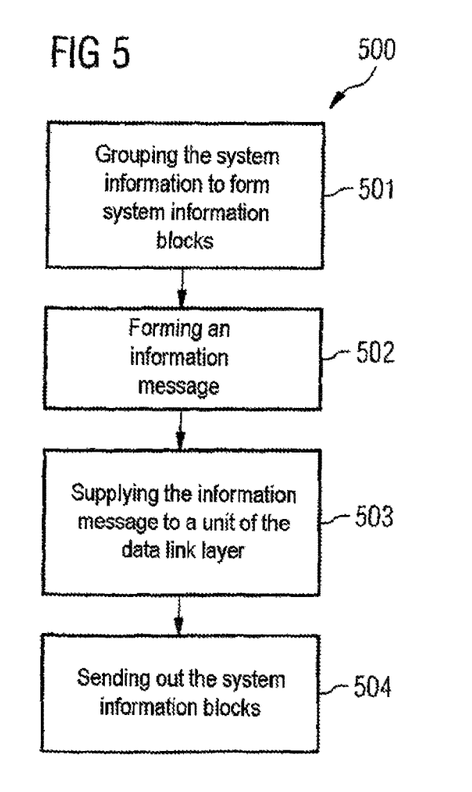
FIG. 5 shows a sequence diagram according to an exemplary embodiment of the invention.

According to one exemplary embodiment of the invention, a method is provided as is shown in FIG. 5.

FIG. 5 shows a sequence diagram 500 according to one exemplary embodiment of the invention.

The sequence diagram 500 illustrates a method for generating and transmitting system information to a mobile radio user device in a mobile radio cell.

In step 501, system information is grouped to form several system information blocks, the information required for a mobile radio user device in order to verify if it is provided with access to the mobile radio cell, are grouped in a single one of the system information blocks.

In step 502, at least one information message is formed from the information blocks.

In step 503, the information message is supplied to a unit of the data link layer by a unit of the network layer.

In step 504, the information message is sent out by the unit of the data link layer by means of at least one unit of the physical layer.

Figure 6:
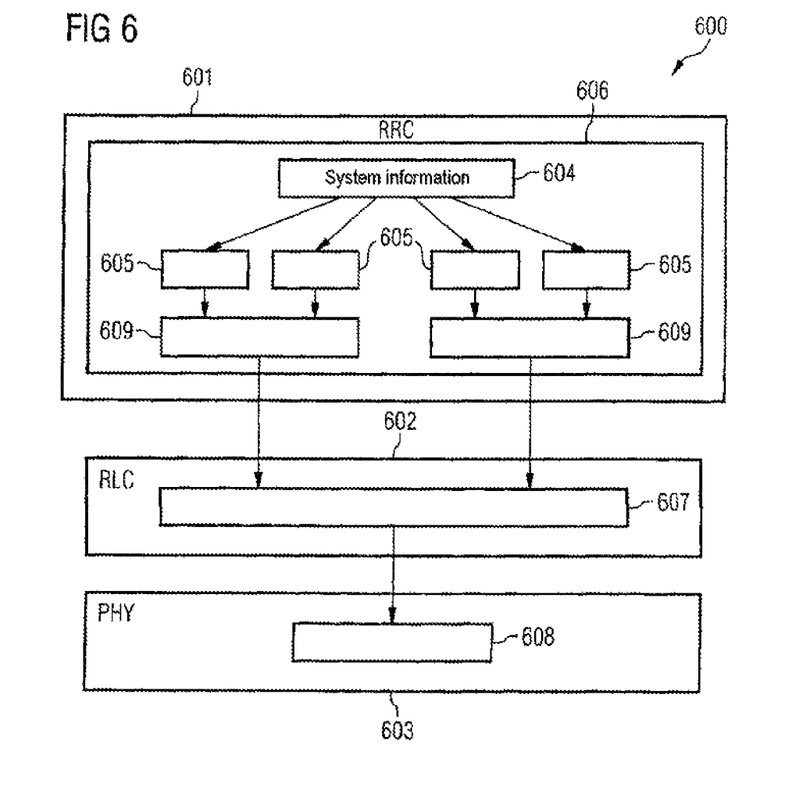
FIG. 6 shows a data flowchart according to an exemplary embodiment of the invention.

In FIG. 6, it is illustrated which tasks are carried out in which layers according to an exemplary embodiment of the invention.

FIG. 6 shows a data flowchart 600 according to one exemplary embodiment of the invention.

The data flow shown takes place between units of the network layer 601, of the data link layer 602 and the physical layer 603.

A unit of the network layer 606, in the present exemplary embodiment a unit of the RRC (radio resource control) layer, that is to say a unit which performs tasks in the framework of the RRC protocol, groups system information 604 to form several information blocks 605.

The system information 604 is generated at least partially by a unit of the RRC layer.

One of the information blocks 605 contains all the information required for a mobile radio user device in order to verify if it is provided with access in the mobile radio cell in which the system information 604 is sent out, that is to say all suitability information.

From the information blocks, information messages 609 are formed in the RRC layer 601, which messages are supplied to a unit of the data link layer 607, in the present example a unit of the RLC (radio link control) layer, that is to say a unit which performs tasks within the framework of the RLC protocol.

The unit of the data link layer 607 supplies the information messages 609, which were supplemented with error correction bits for a possible error correction, or segmented for sending out, for example, by the unit of the data link layer 607, to a unit of the physical layer 608. The unit of the physical layer 608 sends out the information messages 609. For example, the information messages 609 are broadcast in the mobile radio cell.

The information blocks 605 can be both system information blocks (SIBs) and a master information block (MIB).

The sending out of the information messages 609 by means of the unit of the physical layer 608, for example a physical channel, for example a broadcast channel, can also involve a unit of the MAC layer (not shown) which, for example, regulates the access to the physical channel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE DESIGNATIONS

100 Communication system
102, 102 RNS 103, 104 Iu interface
105 Core network
106 User device
107, 108 RNC
109-112 Base stations
113 Iur interface
114-125 Radio cells
126-129 Iub interface
130 Air interface
200 Data flowchart
201 BCCH
202 BCH
203 System information blocks
204 P-CCPCH
205 P-CCPCH transmit frame
300 System information block
301 System frame number
302 SIB data
400 Data structure
401 Sets of suitability information
402 Suitability information identification
500 Sequence diagram
501-504 Sequence steps
600 Data flowchart
601 Network layer
602 Data link layer
603 Physical layer
604 System information
605 Information blocks
606 Unit of the network layer
607 Unit of the data link layer
608 Unit of the physical layer
609 Information messages

The invention claimed is:

1. An apparatus to be implemented in a base station, the apparatus comprising:
a unit of a radio resource control (RRC) layer at least partially implemented in hardware, the unit of the RRC layer to:
identify cell suitability information that includes a first information item to indicate a minimum receiver level, a second information item to indicate whether a radio cell is barred for user devices, an intra-frequency cell reselection indicator, a third information item to indicate a minimum quality level, and a fourth information item to indicate whether the radio cell is reserved for operator use;
identify period information to indicate a period for which system information is valid;
group the cell suitability information into a single information block; and
include the validity period information in the single information block or another information block;
a unit of a physical layer at least partially implemented in hardware, the unit of the physical layer coupled with the unit of the RRC layer, the unit of the physical layer to transmit the cell suitability information and the validity period information in one or more information blocks that includes the single information block.

2. The apparatus of claim 1, wherein the one or more information blocks includes one or more master information blocks and one or more system information blocks.

3. The apparatus of claim 2, wherein the single information block is a system information block.

4. The apparatus of claim 1, wherein the cell suitability information is associated with an identification that is to enable a mobile radio user device to verify whether it has already stored the cell suitability information and signal that the cell suitability information identified by the identification is currently valid in the radio cell.

5. The apparatus of claim 4, wherein the identification is inserted into the single information block.

6. The apparatus of claim 1, wherein the cell suitability information further includes: an item of information on a maximum permissible transmitting power on an uplink, a Local Area Code (LAC), a Public Land Mobile Network (PLMN) identity, a Tbarred parameter value, and a cell reservation extension information item.

7. The apparatus of claim 1, wherein the single information block is to be transmitted at a predefined time subsequent to a transmission of a master information block.

8. One or more non-transitory computer-readable media having instructions that, when executed by at least one of the one or more processors, cause an apparatus to:
identify cell suitability information that includes a first information item to indicate a minimum receiver level, a second information item to indicate whether a radio cell is barred for user devices, an intra-frequency cell reselection indicator, a third information item to indicate a minimum quality level, and a fourth information item to indicate whether the radio cell is reserved for operator use;
identify period information to indicate a period for which system information is valid;
group the cell suitability information into a single information block; and
cause transmission of the cell suitability information and the validity period information in one or more information blocks that include the single information block.

9. The one or more non-transitory computer-readable media of claim 8, wherein the one or more information blocks includes one or more master information blocks and one or more system information blocks.

10. The one or more non-transitory computer-readable media of claim 8, wherein the single information block is a system information block.

11. The one or more non-transitory computer-readable media of claim 8, wherein the cell suitability information is associated with an identification that is to enable a user equipment to verify whether it has already stored the cell suitability information and signal that the cell suitability information identified by the identification is currently valid in the radio cell.

12. The one or more non-transitory computer-readable media of claim 11, wherein the identification is inserted into the single information block.

13. The one or more non-transitory computer-readable media of claim 8, wherein the cell suitability information further includes: a fourth information item to indicate a maximum permissible transmitting power on an uplink, a Local Area Code (LAC), a Public Land Mobile Network (PLMN) identity, a Tbarred parameter value, or a cell reservation extension information item.

14. One or more non-transitory computer-readable media to store instructions that, upon execution, cause a user equipment to:
store cell suitability information received in a single information block, the cell suitability information to include a first information item to indicate a minimum receiver level, a second information item to indicate whether a radio cell is barred for user devices, an intra-frequency cell reselection indicator, a third information item to indicate a minimum quality level, and a fourth information item to indicate whether the radio cell is reserved for operator use;

determine, based on validity period information associated with the cell suitability information, that the stored cell suitability information is valid; and determine, based on determination that the stored cell suitability information is valid, whether the user equipment is provided with access to a mobile radio cell.

15. The one or more non-transitory computer-readable media of claim 14, wherein the single information block is one of a plurality of information blocks that includes one or more master information blocks and one or more system information blocks.

16. The one or more non-transitory computer-readable media of claim 15, wherein the single information block is a system information block.

17. The one or more non-transitory computer-readable media of claim 14, wherein the cell suitability information further includes: an item of information on a maximum permissible transmitting power on an uplink, a Local Area Code (LAC), a Public Land Mobile Network (PLMN) identity, a Tbarred parameter value, and a cell reservation extension information item.

18. The one or more non-transitory computer-readable media of claim 14, wherein the instructions, when executed, further cause the user equipment to receive the single information block at a predefined time subsequent to a transmission of a master information block.

* * * * *